(12) United States Patent
Bottari et al.

(10) Patent No.: US 9,673,898 B2
(45) Date of Patent: Jun. 6, 2017

(54) OPTICAL PATH VALIDATION METHOD

(71) Applicant: Telefonaktiebolaget L M Ericsson (publ), Stockholm (SE)

(72) Inventors: Giulio Bottari, Leghorn (IT); Fabio Cavaliere, Vecchiano (IT)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 0 days.

(21) Appl. No.: 14/432,265

(22) PCT Filed: Oct. 3, 2012

(86) PCT No.: PCT/EP2012/069538
§ 371 (c)(1),
(2) Date: Mar. 30, 2015

(87) PCT Pub. No.: WO2014/053175
PCT Pub. Date: Apr. 10, 2014

(65) Prior Publication Data
US 2015/0256253 A1    Sep. 10, 2015

(51) Int. Cl.
*H04B 10/079* (2013.01)
*H04J 14/02* (2006.01)
*H04Q 11/00* (2006.01)

(52) U.S. Cl.
CPC ...... *H04B 10/0795* (2013.01); *H04J 14/0268* (2013.01); *H04J 14/0269* (2013.01);
(Continued)

(58) Field of Classification Search
CPC ........... H04B 10/0795; H04Q 11/0005; H04Q 11/0065; H04Q 11/0062;
(Continued)

(56) References Cited

U.S. PATENT DOCUMENTS 6,487,595 B1 * 11/2002 Turunen .............. H04L 12/5695
709/226
8,873,948 B2 * 10/2014 Caviglia ............. H04J 14/0227
398/17

(Continued)

FOREIGN PATENT DOCUMENTS

| EP | 1278325 A2 | 1/2003 |
| EP | 2 501 065 A1 | 9/2012 |
| WO | 2007/024317 A2 | 3/2007 |

OTHER PUBLICATIONS

PCT International Search Report, mailed Jul. 9, 2013, in connection with International Application No. PCT/EP2012/069538, all pages.

(Continued)

*Primary Examiner* — Dalzid Singh
(74) *Attorney, Agent, or Firm* — Leffler Intellectual Property Law, PLLC

(57) ABSTRACT

Validating a path in an optical layer of a communications network, for client traffic having an associated service level, involves setting an optical quality margin according to the service level associated with that client traffic. The optical quality margin indicates how close an estimated optical quality of the path can approach a level which produces a threshold error rate. This margin is used to check whether the estimated optical quality is within the optical quality margin set according to the client traffic service level. Making the optical quality margin dependent on client traffic service level, can enable increased optical reach. This can give more flexibility in path selection and enable better matching to service levels of client traffic.

13 Claims, 12 Drawing Sheets

(52) U.S. Cl.
CPC ...... *H04J 14/0271* (2013.01); *H04Q 11/0005* (2013.01); *H04Q 11/0062* (2013.01); *H04J 14/026* (2013.01); *H04Q 2011/0073* (2013.01); *H04Q 2011/0084* (2013.01)

(58) Field of Classification Search
CPC ..... H04Q 2011/0084; H04Q 2011/0073; H04J 14/0269; H04J 14/0268; H04J 14/0271; H04J 14/026
USPC .......................................................... 398/28
See application file for complete search history.

(56) References Cited

U.S. PATENT DOCUMENTS

| | | | | |
|---|---|---|---|---|
| 9,042,726 B2* | 5/2015 | Togo | .................... | H04J 14/0227 398/49 |
| 9,100,120 B1* | 8/2015 | Friskney | ................ | H04B 10/25 |
| 2002/0063915 A1* | 5/2002 | Levandovsky | .... | H04Q 11/0062 398/27 |
| 2008/0056141 A1* | 3/2008 | Sheinfeld | ................ | H04L 41/06 370/244 |
| 2013/0202299 A1* | 8/2013 | Prakash | .............. | H04J 14/0257 398/51 |
| 2014/0328587 A1* | 11/2014 | Magri | ................ | H04Q 11/0066 398/26 |

OTHER PUBLICATIONS

Lee, Y. et al. "PCEP Extensions for WSON Impairments; draft-lee-pce-wson-impairments-02.txt" Internet Engineering Task Force, IETF; Standard Working Draft, Internet Society (ISOC) 4, Rue Des Falaises CH-120 Geneva, Switzerland, No. 2, Jul. 7, 2011, pp. 1-19, XP015077037.

Banerjee, A. et al. "Impairment Constraints for Routing in All-Optical Networks; draft-banerjee-routing-impairments-00.txt", Mar. 1, 2001, XP015010606, pp. 1-6, ISSN: 0000-0004.

Paolucci, F. et al. "Experimental Demonstration of Impairment-Aware PCE for Mutli-Bit-Rate WSONs" IEEE/OSA Journal of Optical Communications and Networking, IEEE, USA, vol. 3, No. 8, Aug. 1, 2011, pp. 610-619, XP011360019, ISSN: 1943-0620.

Vusirikala, V. et al. "Google; Beyond 100GbE: How Datacenter Interconnects Drive Demand for Higher Speed" OFC/NFOEC 2010 Technical Conference, Mar. 21-25, 2010, San Diego, CA, USA, Mar. 25, 2010, pp. 1-9.

Pfau, T. "Hardware requirements for coherent systems beyond 100G" ECOC 2009, Sep. 20-24, 2009, Vienna, Austria, WS1: DSP & FEC, Alcatel-Lucent, pp. 1-10.

Sambo, N. et al. "Modeling and Distributed Provisioning in 10-40-100-Gb/s Multirate Wavelength Switched Optical Networks", Journal of Lightwave Technology, vol. 29, No. 9, May 1, 2011, IEEE, pp. 1248-1257.

Christodoulopous, K. et al. "Dynamic bandwidth allocation in flexible OFDM-based networks" in Proc. of OFC/NFOEC 2011, Mar. 6-10, 2011, Los Angeles, CA, USA, pp. 1-3, IEEE, ISBN: 978-1-4577-0213-6.

EP Communication, mailed Apr. 12, 2016, in connection with European Application No. 12769650.8, all pages.

* cited by examiner

OPTICAL PATH VALIDATION METHOD

TECHNICAL FIELD

The present invention relates to methods of validating paths in a communications network, to corresponding apparatus and to corresponding computer programs, and to controllers for optical wavelength switches and to apparatus such as computers for off-line planning and to apparatus for multilayer nodes.

BACKGROUND

In conventional optical networks there is always a limit to how far an optical signal can be transmitted along an optical path before the optical signal is lost in optical noise, or before there is sufficient noise to cause intolerable bit errors at the receiver. The target OSNR is the OSNR value at which the receiver reaches the target Bit Error Rate (BER). The OSNR margin, or simply "margin", is the difference between the estimated OSNR and the target OSNR. In conventional link engineering, the margin has to budgeted in the design phase also taking into account system aging and other unexpected degradation events during the lifetime of the transmission infrastructure. Different physical layer phenomena are taken into account while estimating the margin.

SUMMARY

Embodiments of the invention provide improved methods and apparatus. According to a first aspect of the invention, there is provided a method of validating a path in an optical layer of a communications network, for client traffic having a service level associated with that client traffic. There are steps of setting an optical quality margin according to the service level associated with that client traffic, and validating the path. The optical quality margin indicates how close an estimated optical quality of the path can approach a level which produces a threshold error rate in transmitted client traffic. A check is made whether the estimated optical quality is within the optical quality margin set according to the client traffic service level.

By making the optical quality margin dependent on client traffic service level, this can enable increased optical reach. This can give more flexibility in path selection and enable better matching to service levels of client traffic. Overall this can help increase network capacity or reduce wasted capacity in the network. See FIGS. 1 and 2 for example.

Any additional features can be added to the above features, or can be disclaimed. Some such additional features are set out below and described in more detail. One such additional feature is the service level representing a level chosen from at least a best effort service level and a guaranteed service level. This distinction between service levels indicating whether the service is guaranteed or not, is particularly useful since the optical quality margin can be reduced significantly for the best effort service level. See FIG. 3 for example.

Another such additional feature is the client traffic being packet based traffic, and the method having the step of obtaining the service level for the packet based client traffic. The additional flexibility provided by the adaptable optical quality margin is particularly useful here as such packet based traffic can often be dynamic and somewhat unpredictable in nature. See FIG. 3 for example.

Another such additional feature is the above method when used in an on-the-fly dynamic path computation step. The additional flexibility or additional optical reach is particularly useful for such path computation since it is often constrained by time or processing power limitations, at least for larger networks. See FIG. 2 or 3 for example.

Another such additional feature is the above method when used in off-line pre planning of paths for different service levels of possible client traffic, and having the subsequent step during on-line operation of the network, of selecting between the pre planned paths according to the actual service level of actual client traffic.

Since pre planning can enable more complex path computation, the additional flexibility and optical reach of the adaptable optical quality margin can be exploited more fully. See FIGS. 4 and 5 for example.

Another such additional feature is the above method when used in validating a recovery path for client traffic. This is particularly useful as the recovery path is likely to be temporary and so can justify a lower optical quality margin, enabling longer recovery paths or more paths to be found, thus increasing the resilience of the network. See FIG. 6 for example.

Another such additional feature is the network having a packet layer, and the method having the preliminary step of passing an indication of the service level associated with the client traffic from a client layer control entity to a control entity of the optical layer, for use in setting the optical quality margin. This is one particular way of obtaining the service level information efficiently, making use of existing control entities, while preserving their control domains, to enable the adaptation of the optical quality margin. See FIG. 7 for example.

Another such additional feature is the network having at least one intermediate layer between the packet layer and the optical layer, and the step of passing the indication has the steps of passing the indication to a control entity of the intermediate layer, and from the control entity of the intermediate layer to the control entity of the optical layer. Again this makes use of existing control entities, while preserving their control domains. See FIGS. 7 and 8 for example Another such additional feature is the optical layer having flexible optical bandwidth multiplexing, and the validating step being part of a path computation involving selecting any one or more of optical bandwidth, optical bitrate, and optical modulation format for the client traffic. The adaptable optical quality margin adds further flexibility which is compatible with the flexible optical bandwidth multiplexing and can be exploited with little additional complexity of path computation. See FIG. 9 for example.

Another aspect of the invention provides apparatus having a processor configured to carry out any of the above methods.

Another aspect of the invention provides a computer program on a computer readable medium and having instructions which when executed cause the processor to carry out the method.

Another aspect of the invention provides apparatus for validating a path in an optical layer of a communications network, for client traffic having a service level associated with that client traffic, the apparatus having a processor configured to receive an indication of the service level associated with that client traffic, to set an optical quality margin according to the service level associated with that client traffic. The optical quality margin indicates how close an estimated optical quality of the path can approach a level which produces a threshold error rate in transmitted client traffic. The processor can be configured to check whether the estimated optical quality is within the optical quality margin set according to the client traffic service level.

Another such additional feature is control apparatus for setting up the validated path in an optical switch of the optical layer of the network.

Another such additional feature is the optical layer comprising a flexible optical bandwidth multiplexing optical layer and the processor being configured to check a path having a selected optical bandwidth, and the control apparatus being configured to set the optical bandwidth of the validated path in the optical layer according to a result of the check.

Another such additional feature is the apparatus being for off-line pre planning of paths for different service levels of possible client traffic.

Another such additional feature is apparatus being in the form of a multilayer node for a network having a client layer and the optical layer, and having a client layer control entity configured to pass an indication of the service level associated with the client traffic to a control entity for the optical layer, for use in setting the optical quality margin.

Another aspect provides a corresponding computer program.

Any of the additional features can be combined together and combined with any of the aspects. Other effects and consequences will be apparent to those skilled in the art, especially compared to other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which.

DETAILED DESCRIPTION

Figure 1:
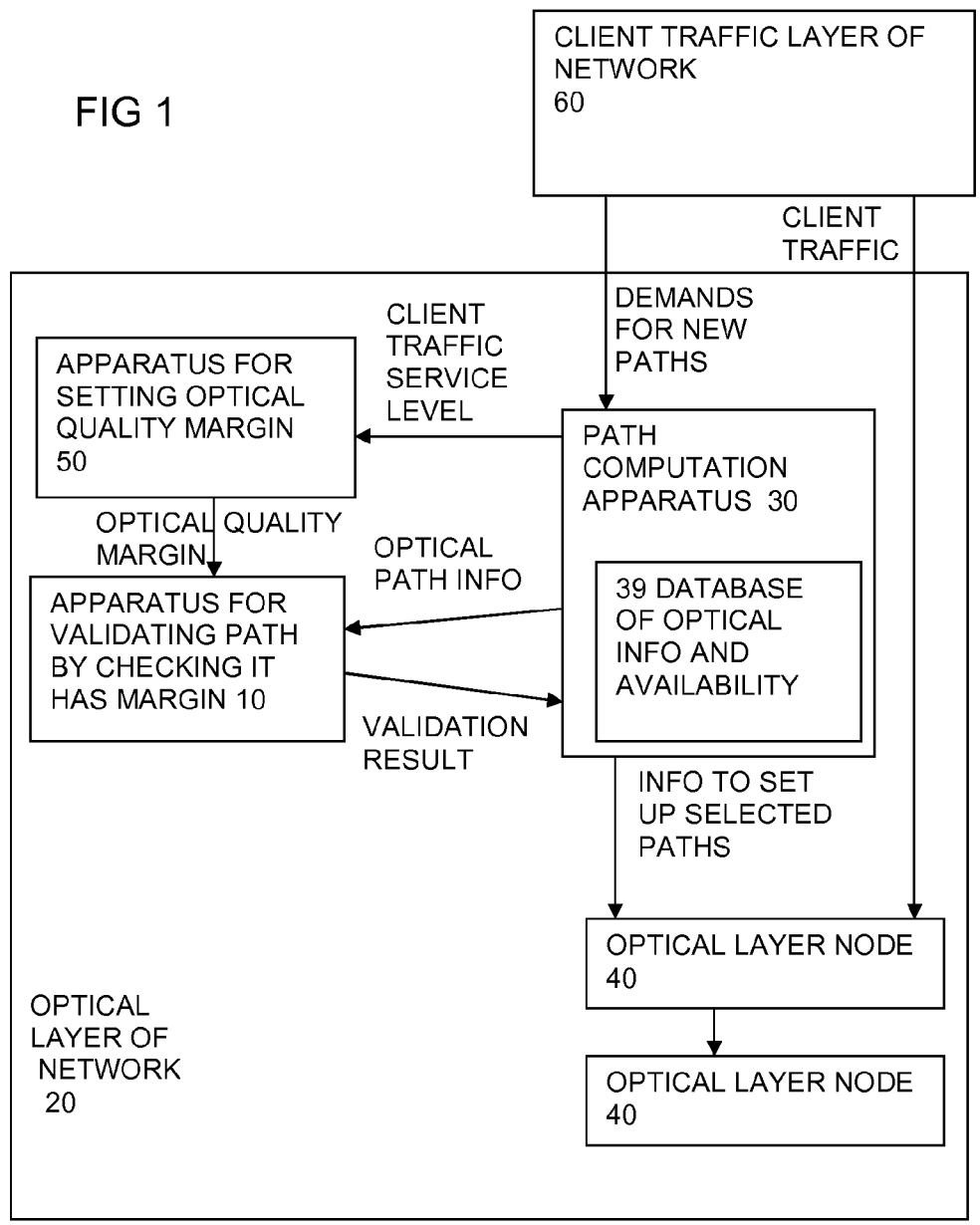
FIG. 1 shows a schematic view of apparatus for path validation in a network according to an embodiment.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn to scale for illustrative purposes.

Definitions:

Where the term "comprising" is used in the present description and claims, it does not exclude other elements or steps and should not be interpreted as being restricted to the means listed thereafter. Where an indefinite or definite article is used when referring to a singular noun e.g. "a" or "an", "the", this includes a plural of that noun unless something else is specifically stated. Elements or parts of the described nodes or networks may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware. References to nodes can encompass any kind of node including ROADMs, cross connects, other switching nodes, not limited to the types described, not limited to any level of integration, or size or bandwidth or bit rate and so on. References to software can encompass any type of programs in any language executable directly or indirectly on processing hardware.

References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

References to optical quality can encompass any measure that represents the effectiveness of the transmission of data at the optical level, such as bit error rate or signal to noise ratio. It may encompass OSNR or noise level for a given optical signal power or optical power level for a given optical noise level, or BER or similar. It may encompass measurements or predictions with or without error correction, and measurements with or without any regeneration or other processing.

References to selecting a path are intended as encompassing selecting from pre-planned paths, or dynamically finding paths, and validating such paths, or selecting characteristics of the path such as bandwidth, bit rate, modulation format and so on.

References to validating are intended as encompassing any way of checking an optical path, including at least comparing an estimated OSNR with a threshold OSNR, and similar.

References to service level are intended to encompass any of best effort, guaranteed bandwidth, guaranteed error rate, guaranteed delay, characteristics suitable for video, characteristics suitable for HD video, characteristics suitable for VoIP, characteristics suitable for data which can tolerate retransmission, tolerate error bursts, is interruptible and so on.

Abbreviations

BV-OXC: bandwidth variable optical cross-connect
DP-QPSK: dual polarization quadrature phase shift keying
HD High Definition
MPLS Multi Protocol Label Switching
OFDM: Orthogonal frequency division multiplexed
OTN Optical Transport Network
PCE: Path Computation Element
QAM: quadrature amplitude modulation ROADM: Reconfigurable Add Drop Muxdemux
RSA: Routing and Spectrum Assignment
SDH Synchronous Digital Hierarchy
VoIP Voice over Internet Protocol
WSON: wavelength switched optical network
Introduction By way of introduction to the embodiments, how they address some issues with conventional designs will be explained.

In optical networks with many links, paths may be computed by a path computation element on the fly, in response to traffic requests. To avoid the risk of the paths being too long and thus having insufficient margin evaluation of the margin is necessary, this is known as validation. This involves estimating the OSNR from known optical qualities of the links and optical components along the proposed path.

The use of a margin ensures a desired maximum BER level during the whole network lifetime. However, it's not "for free" because it implies untapped OSNR and, ultimately, bandwith capacity. The tributary of an optical channel (wavelength) is typically a packet client possibly framed using one or more intermediate layers like Ethernet, OTN, MPLS, SDH/SONET. Such clients can require a guaranteed (e.g."carrier class") or a "best effort" service level. In the case of best effort clients, the level of BER ensured by the margin at the optical layer can be too restrictive. A more relaxed BER level can meet the needs of the best effort client. In addition packet technology can use peculiar mechanism (e.g. retransmission) to mitigate the effects of a more relaxed BER.

At least some of the embodiments aim at reducing an excess of optical signal quality (OSNR margin, BER) that could be used to allocate additional bandwidth or distance when an optical channel is used to transport best effort packet clients. The embodiments can encompass amongst others, applications to optical networks for data center interconnection. Some embodiments can be used in a multi-technology packet-optical context where a collective, shared, intelligence (control plane/management plane) can exchange information between the two layers.

The packet clients can be wrapped in intermediate bearers (i.e. in Ethernet at layer two) and then sent to the optical layer to be embedded in two separate wavelengths, one per service level. The required service level at the packet layer is communicated to the optical layer so that, in case of best effort packet client, longer optical paths with reduced OSNR margins can be allocated, gaining bandwidth and reach. For carrier class clients the margin is unaffected.

Some embodiments are useful in a multi-technology landscape where a packet layer and an optical layer operate concurrently to transport traffic. The target node (apparatus) can be an integrated packet-optical node, or a router connected to a standalone optical node (e.g. a ROADM). Intermediate layers can be present between the packet layer and the optical layer.

A simple embodiment can be applied to a chain of nodes. Two packet clients are sent to the packet module of a source node. The first client, requires a best effort service level. The second client, requires a guaranteed service level. The packet clients are wrapped in the intermediate bearers (i.e. in Ethernet at layer two) and then sent to the optical layer to be embedded in two wavelengths. The two wavelengths shall arrive on the receiver with appropriate margins. For example the best effort client can be sent on a wavelength with a near zero margin on the receiver, while the guaranteed service level client shall use a wavelength with at least 3 dB of margin.

By looking at the required service level, the minimum tolerated optical quality margin for the wavelength can be decided. In case of preplanned wavelength paths, there can be different pre-planned paths for each service level, each validated to a different optical quality margin. Then in use, one of these pre planned wavelength is selected, having an optical quality margin compatible with the service driven requirement. In case of wavelengths activated on the fly, the activation can be done on a path/reach/rate/format which ensures the appropriate margin.

Figure 2:
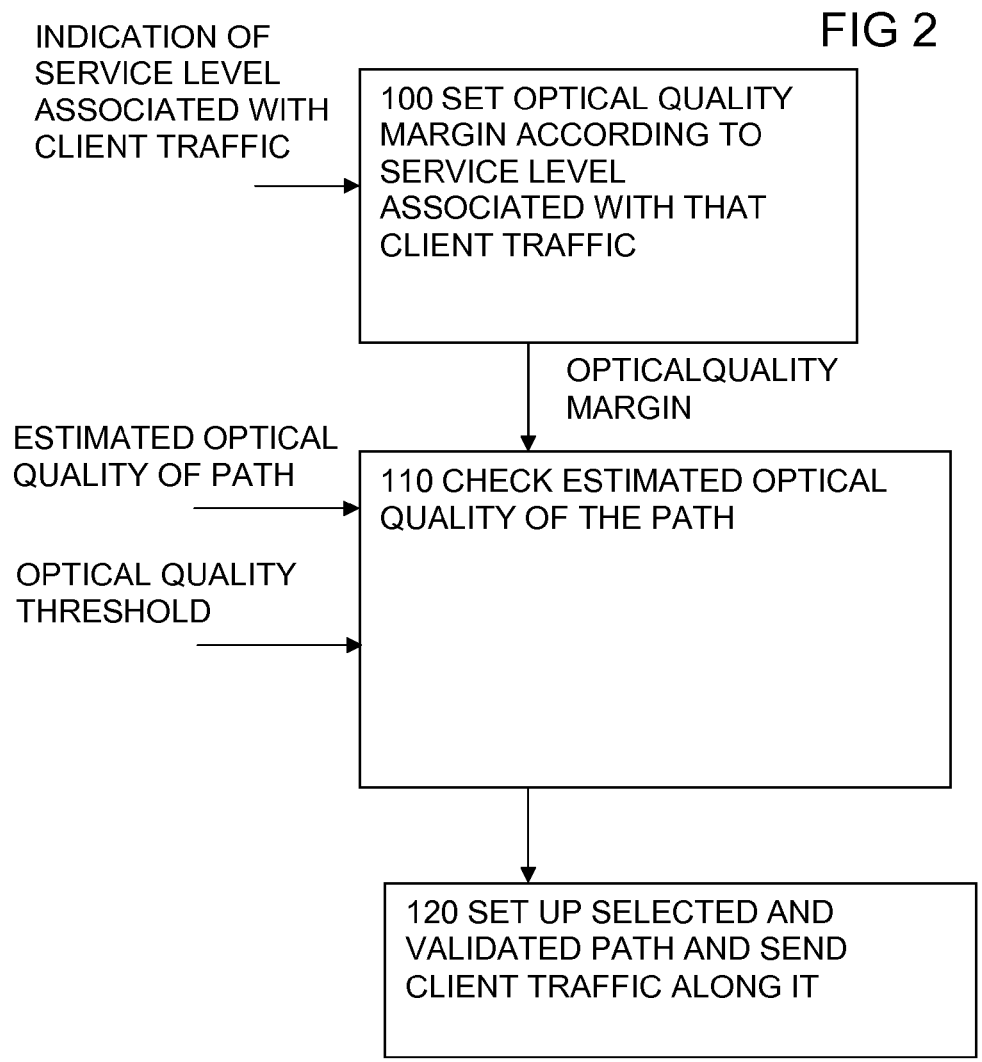
FIGS. 2 and 3 show steps of a method according to an embodiment.
Figure 3:
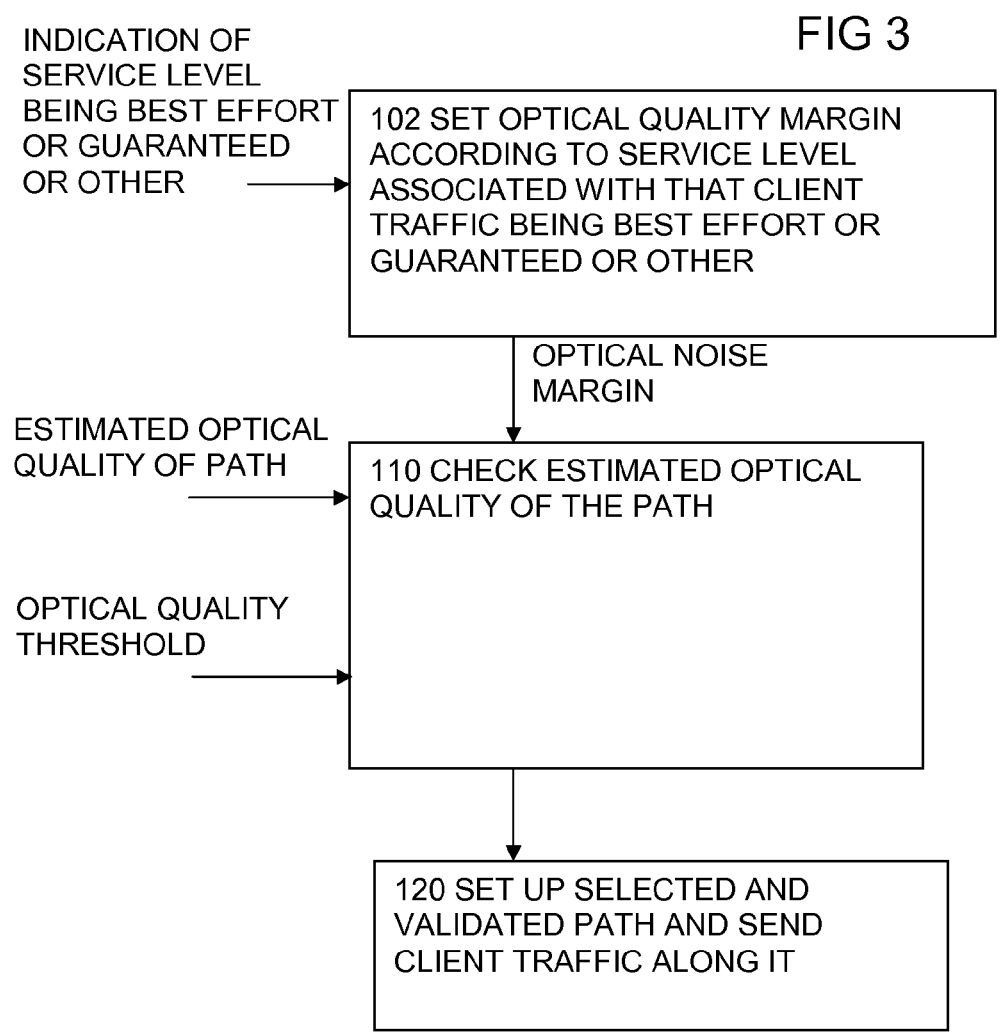

FIGS. 1, 2, 3 Embodiments Showing Path Validation

FIG. 1 shows a schematic view of apparatus for path validation in a network according to an embodiment of the invention. The network has at least an optical layer 20 and a client traffic layer 60. The client traffic layer 60 of the network is shown feeding demands for new paths for client traffic to a path computation apparatus 30 of the optical layer. This and other apparatus features can be implemented in hardware or more usually in software running on general purpose hardware. The path computation apparatus is able to compute possible paths through the optical layer to the given destination node for the client traffic. This may depend on available capacity on different links of the optical layer, and such availability information is typically stored in a database 39 (which can be incorporated as a part of the path computation apparatus, or implemented separately) and continually updated. Whether the computed paths are of sufficient optical quality is determined by a validation function. This is carried out by apparatus 10 for validating paths by checking if the estimated optical quality is within an optical quality margin. This depends on optical path information provided by the path computation apparatus typically from its database. The validation here also depends on an optical quality margin, which is variable and set by an apparatus 50 for setting optical margin, according to a client traffic service level. The service level can be an indication of best effort or guaranteed (e.g. carrier class), or other levels. The validation is usually to check that the estimated optical quality is not too close to the threshold, and leaves sufficient margin, though in principle the check can also (or alternatively) be that the estimated optical quality is not too far from the threshold and thus effectively invalid for wasting too much margin.

The validation result is returned to the path computation apparatus and helps enable the path computation apparatus to select a path, and then set up the path in the optical layer 20 of the network. The validation can be carried out after path computation, or as part of the path computation. The optical layer is shown as having optical layer nodes 40, which may be for example wavelength switches, ROADMs or cross connects and so on. The optical layer can in principle be formed by a simple point to point link, or a network of links and nodes. Once the path is set up, the client traffic can flow from the source node through the optical layer to the destination node.

FIG. 2 shows steps in the operation of the embodiment of FIG. 1 or other embodiments. At step 100 the optical quality margin for validating a given path is set according to the service level of the client traffic requesting the path. At step 110, the optical quality margin is used in checking the path. The estimated optical quality of the path is input. This can be calculated or looked up and is a conventional step which can be carried out in various ways, and is described in more detail with reference to FIGS. 10 and 11 below. An optical quality threshold is another input, which may itself be variable, if for example there are optical receivers of different performance in the optical layer. This threshold represents a quality which leads to an acceptable bit error rate. The validation involves checking whether the estimated optical quality is better than the threshold optical quality by sufficient margin, that sufficient margin being the variable optical quality margin set according to the service level. The optical margin is considered on the optical receiver interface (e.g. on a ROADM where the optical signal is terminated). At step 120 the selected and validated path can be set up and client traffic can be sent along it. In principle, these steps are used whether the paths are selected on the fly, or on a pre planned basis as discussed below in relation to FIG. 4.

FIG. 3 shows steps in the operation of the embodiment of FIG. 1 or other embodiments and has steps similar to those of FIG. 2, but is intended to show an example where the service level indicates best effort or guaranteed or other level. At step 102 the optical quality margin for validating a given path is set according to whether the service level of the client traffic requesting the path is best effort or guaranteed or other. At step 110, as in FIG. 2, the optical quality margin is used in checking the path. The estimated optical quality of the path is input to check whether it is within the optical quality margin as described above.

Figure 4:
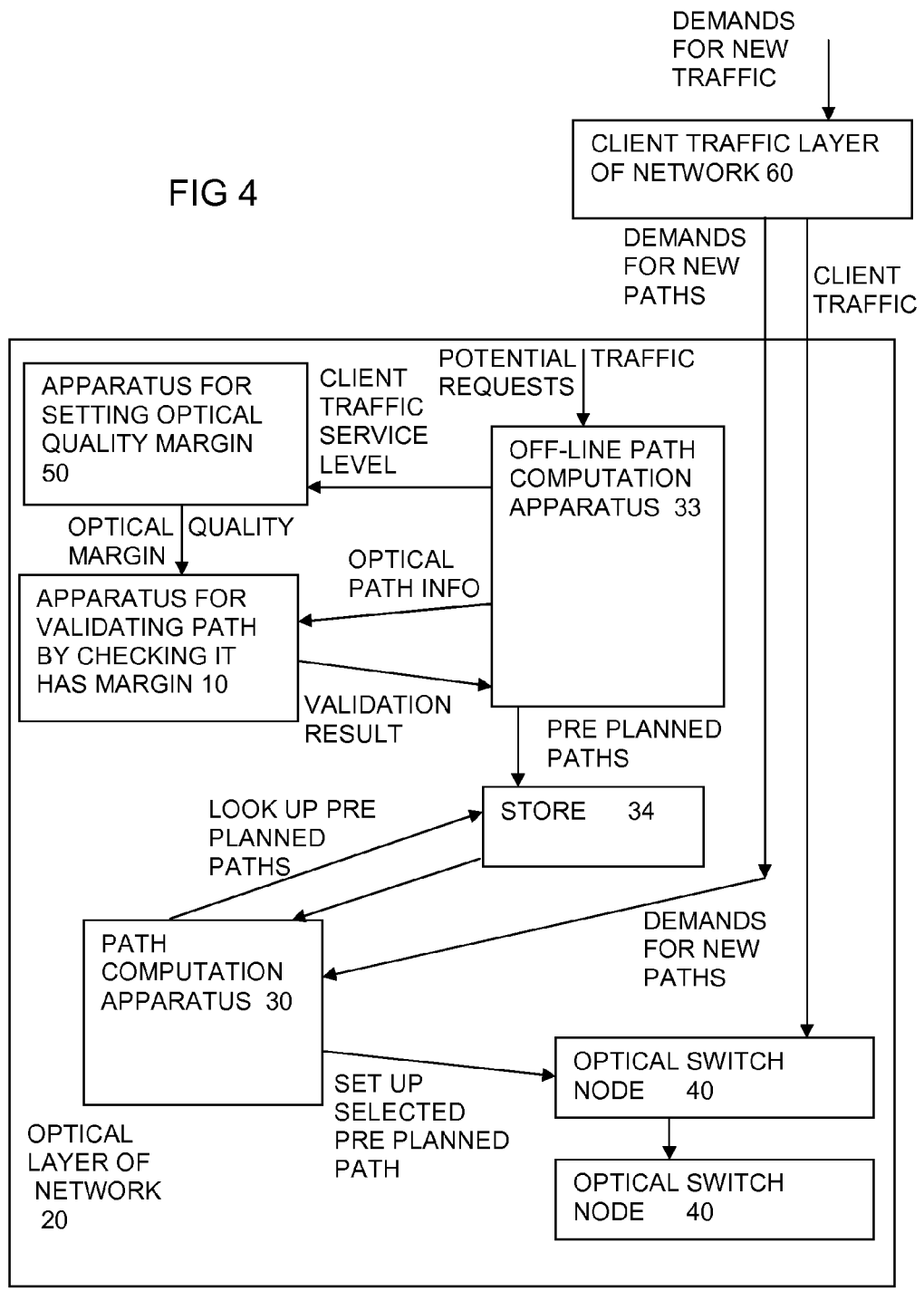
FIG. 4 shows another apparatus embodiment involving validating pre planned paths.
Figure 5:
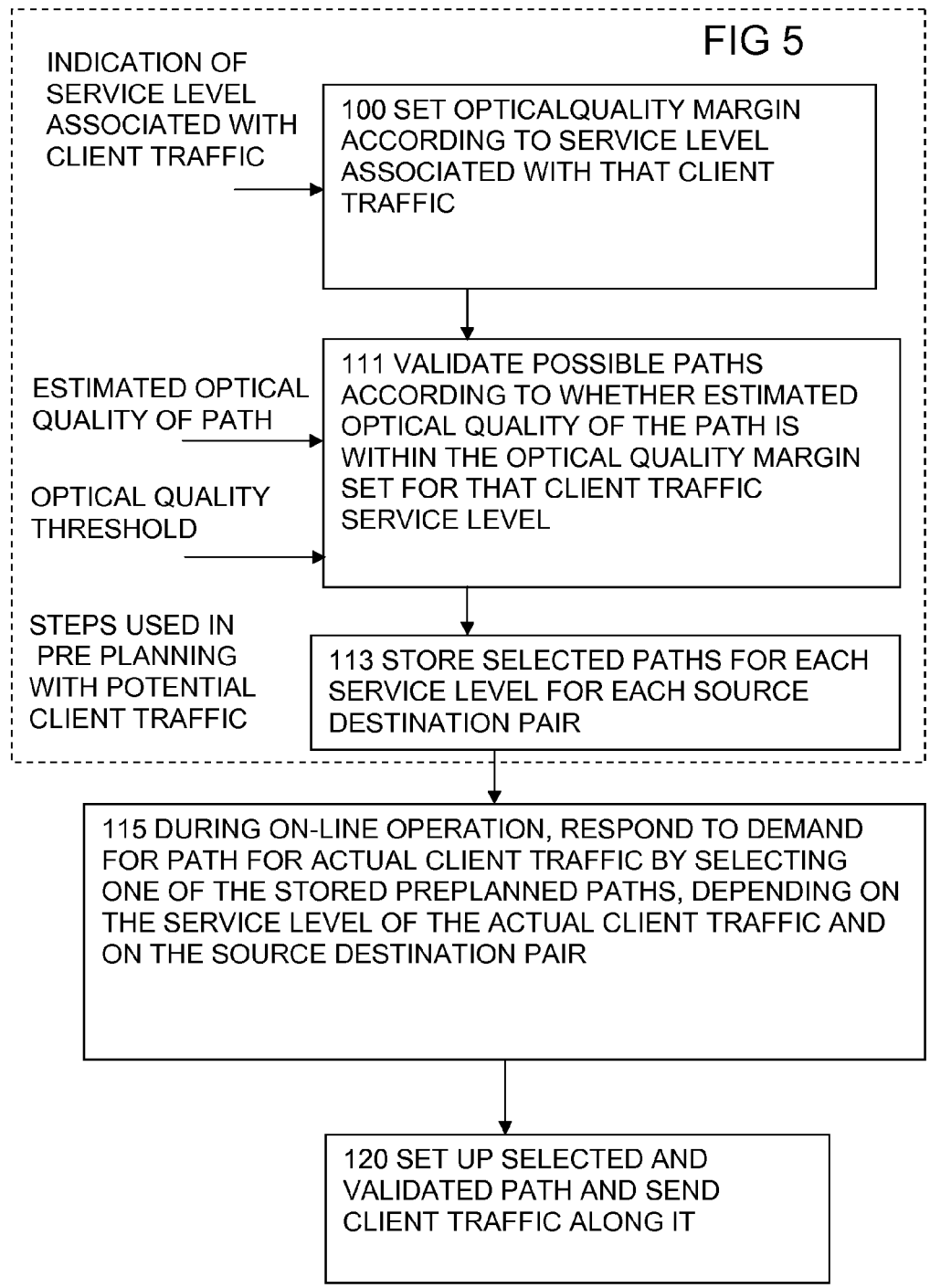
FIG. 5 shows steps of another embodiment involving validating pre planned paths.

FIGS. 4, 5 Pre Planned Example

FIG. 4 shows a schematic view of another embodiment, similar to that of FIG. 1, but showing an example of additional features involved in selecting and validating pre planned paths, which are then stored for use later. An off-line path computation apparatus 33 is provided, coupled to receive potential traffic requests rather than actual ones, and thus can select paths for some or every combination of source and destination, and for different levels of service. The apparatus for setting the optical quality margin and for checking whether the estimated optical quality of the paths is within the adaptable optical quality margin are as shown in FIG. 1. The pre planned paths that are validated are stored in store 34. There they can be looked up by a path computation apparatus 30 which receives demands for new paths from the client layer 60. Other parts can be as shown in FIG. 1.

FIG. 5 shows steps in the operation of the embodiment of FIG. 4 or other embodiment. Steps 100, 111 and 113 are used in the off line pre planning phase. At step 100 the optical quality margin for validating a given path is set according to the service level of the client traffic requesting the path. At step 110, the optical quality margin is used in checking the path for the possible traffic. The estimated optical quality of the path is an input, and may be calculated by the off line path computation apparatus. An optical quality threshold is also input, and the pre planned path can be validated by checking if the estimated optical quality leaves more margin than the selected optical quality margin from the threshold. This can be repeated for some or all of the possible source-destination pairs and for all the service levels, and the selected paths can be stored at step 113.

During on-line operation of the network, at step 115, in response to a demand for a path for client traffic, there is a step of looking up one of the stored pre planned paths. This store can be addressed using the source and destination information and the service level of the client traffic. As before, at step 120, the selected and validated path is set up and client traffic can be sent along it.

Figure 6:
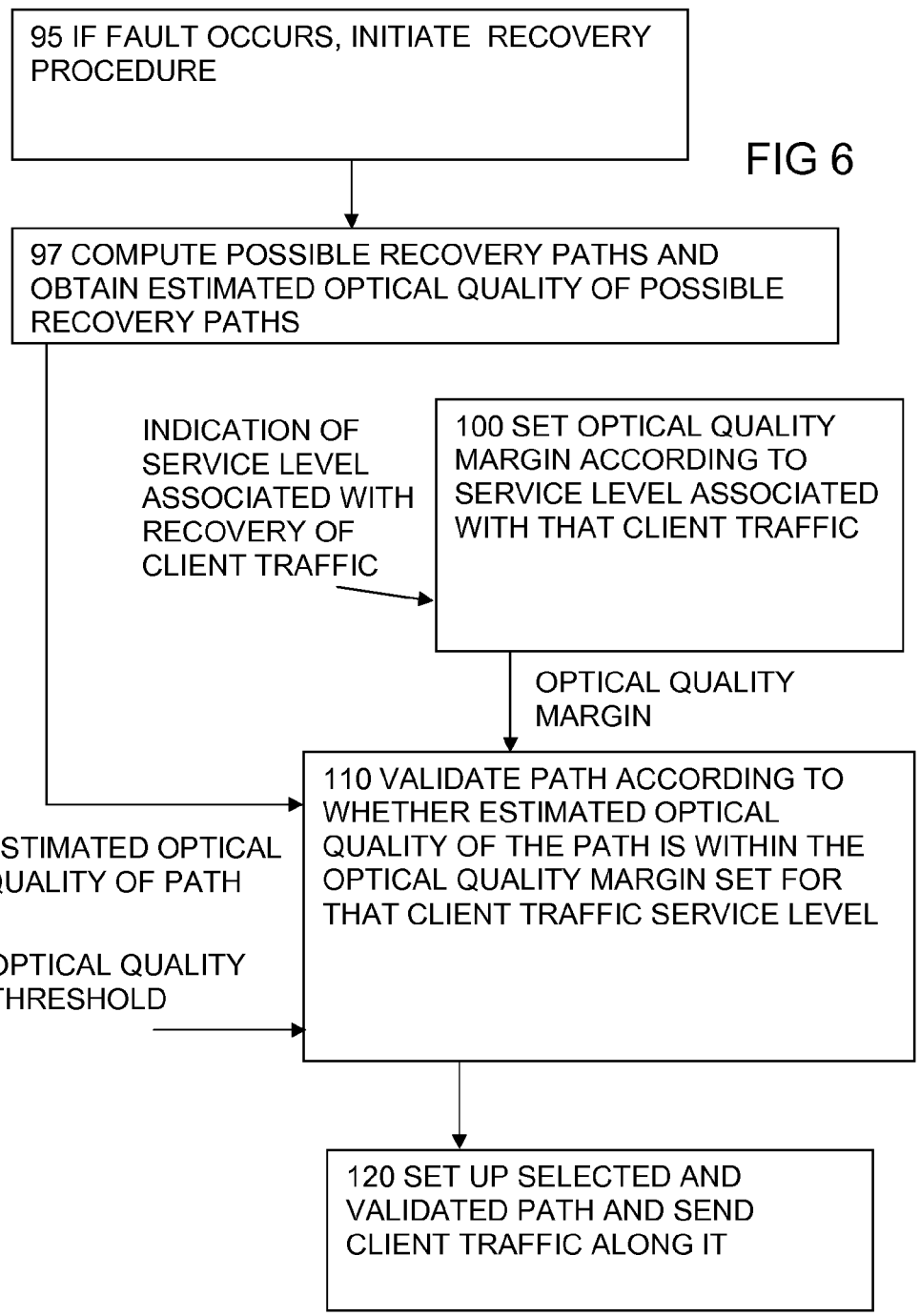
FIG. 6 shows steps of another embodiment involving recovery

FIG. 6, Recovery Example

FIG. 6 shows steps in the operation of the embodiment of FIG. 1 or other embodiments and has steps similar to those of FIG. 2, but is intended to show an example where the path selection is for a recovery path. In this case there are preliminary steps of detecting a fault and initiating a recovery procedure at step 95, and computing possible recovery paths at step 97. The possible path or paths are then validated. This involves obtaining estimated optical quality of the possible recovery paths at step 97, and setting an optical quality margin at step 100, according to the service level associated with the traffic. This service level or the resulting optical quality margin can be revised to be less stringent, to reflect the fact that a recovery path is likely to be temporary, and is usually urgent. Further steps 110 and 120 are as FIG. 2.

Figure 7:
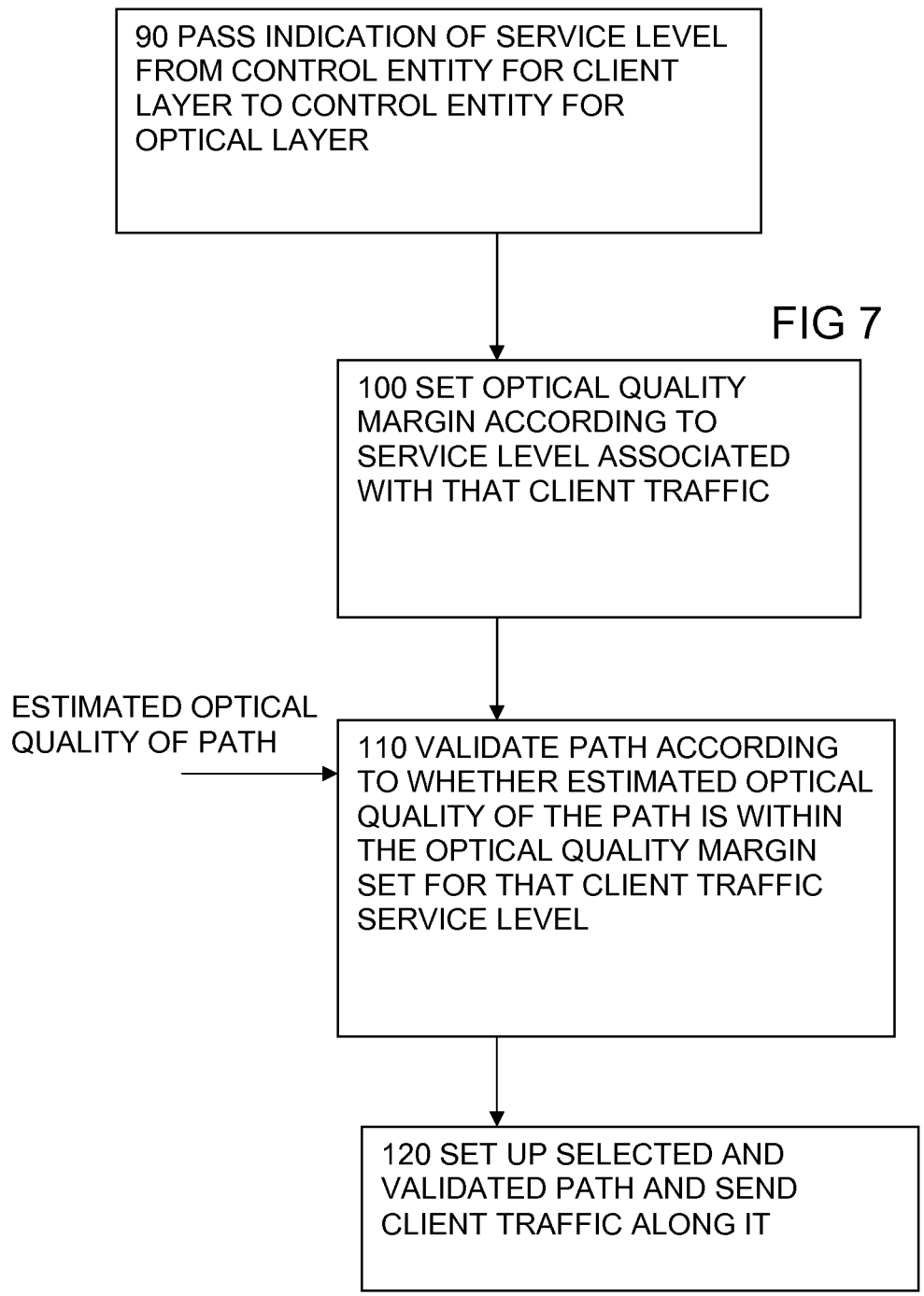
FIG. 7 shows steps of another embodiment involving obtaining the service level

FIG. 7, Indication of Service Level

FIG. 7 shows steps in the operation of the embodiment of FIG. 1 or other embodiments and has steps similar to those of FIG. 2, but is intended to show an example of additional features for obtaining the service level information, for use in setting the adaptable optical quality margin. At step 90 the indication of service level is passed from a control entity for the client layer, to a control entity for the optical layer. This can be for example passed with the other information usually needed by the optical layer, such as source and destination, and bandwidth for the traffic demand. This could be implemented in various ways, such as using the PCE communication protocol (PCEP) for sending path computation requests to a PCE (i.e., using a PCEP PCReq message). The control entity for the optical layer can be for example the path computation apparatus, though in principle it could be other parts. For example since the service level information is needed by the optical quality margin setting apparatus, this could be an example of a control entity and the service level information could be sent directly to this part. The path computation and validation functions can be centralized or distributed or partially distributed, and likewise the control entity for the client traffic layer may be centralized or distributed or partially distributed. Hence the passing of the service level information may take place across different nodes, or may take place within the same multilayer node.

Figure 8:
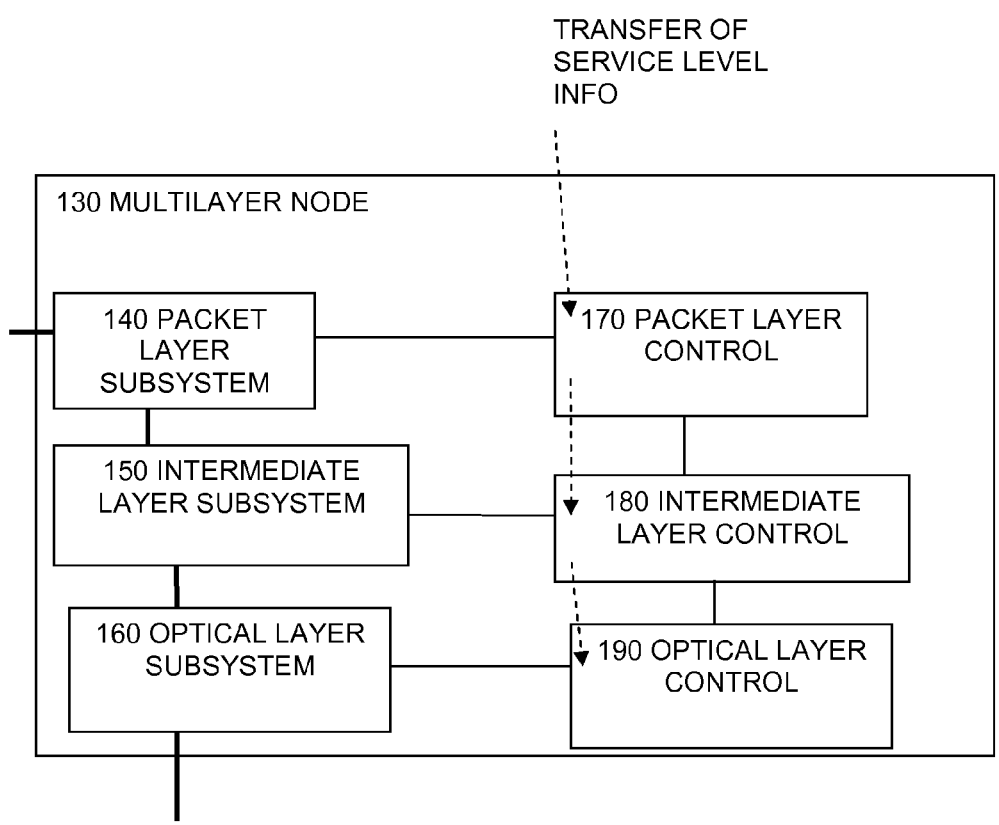
FIG. 8 shows a schematic view of a multilayer node for use in an embodiment.

FIG. 8, Multilayer Node Example

FIG. 8 shows a schematic view of a multilayer node and shows an example of the transfer of an indication of service level for client traffic, from a client layer control entity to an optical layer control entity. In the multilayer node 130 there are shown three layers for processing the traffic, and three corresponding control entities for the layers. A packet layer subsystem 140 may be a packet switch for example, and this is coupled to a corresponding packet layer control entity 170. This may have routing tables for example and may implemented in hardware or software running on general purpose processing hardware as usual. This may be part of a wider packet layer control structure which can undertake end to end routing at a logical level, and leaves the optical layer to do the routing at the physical level and to do the wavelength assignment for the path.

The packet layer subsystem has a path for traffic to an intermediate layer subsystem 150. This may be for example an Ethernet switch or MPLS processing layer or OTN processing layer. A corresponding control entity is shown as the intermediate layer control entity 180, coupled to the intermediate layer subsystem 150. This has a path for traffic to an optical layer subsystem 160, which can be for example a ROADM, an optical cross connect, an optical regen or a wavelength switching system for example. This is coupled to an optical layer control entity 190, which may be implemented by parts 10, 30, 39, 50 shown in FIG. 1 for example. The transfer of the service level information for particular client traffic is shown by dashed arrows from the client interface (not shown) to the packet layer control entity 170, and from there to the intermediate layer control entity 180, which passes it on to the optical layer control entity 190. Here it is used for setting the optical quality margin.

Figure 9:
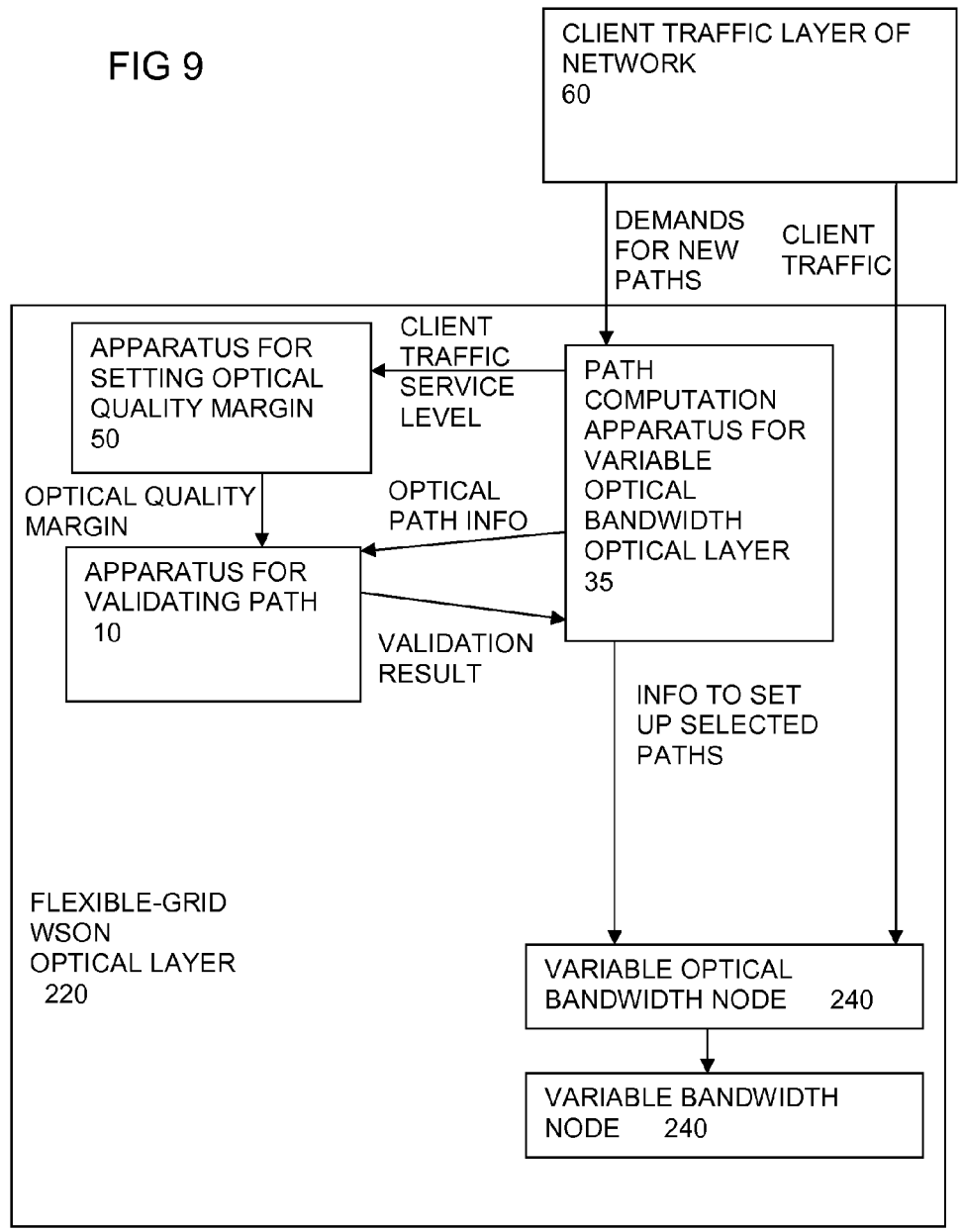
FIG. 9 shows another apparatus embodiment involving paths for a variable optical bandwidth optical layer.

FIG. 9, Example Using Variable Optical Bandwidth Optical Layer

FIG. 9 shows a schematic view similar to that of FIG. 1, but intended to show an example of the additional features for application to an optical layer 220 having flexible or variable optical bandwidth allocation. Thus there is a path computation apparatus 35 for computing paths for a variable optical bandwidth layer. The nodes shown are variable optical bandwidth nodes 240. Otherwise the remaining parts shown are similar to those of FIG. 1 and corresponding reference numerals have been used. So the apparatus for setting optical quality margin and the apparatus for validating the path can operate as described above, even though the path computation is more complex for this type of optical layer.

Path computation for a flexible optical bandwidth optical layer can exploit several techniques which, depending on the modulation format, are able to allocate the required frequency slots along the path while limiting the spare capacity. A database can be provided for storing a network topology, and current slot availability information. A flexible-grid WSON network has a number of variable bandwidth nodes 240 which may be for example ROADMs or BV-OXCs. Traffic demands are fed to the PCE. The PCE is coupled to the database to access the information about the network topology and the slot availability. The PCE is able to compute a route for the new path and to assign frequency slots to the new paths. An indication of the assigned frequency slots is sent to the relevant nodes in the network so that the new traffic can be passed over the network. The indication is also sent to the database to enable it to update the current slot availability information.

An example of a network to which this can be applied is a transparent WSON with E nodes and V bi-directional links, in which the nodes support transmission and reception at 100 and 400 Gb/s. 100 Gb/s is supported by dual polarization quadrature phase shift keying (DP-QPSK) or other techniques. 400 Gb/s is supported by dual polarization and 4-quadrature amplitude modulation (QAM), or 16-QAM, or 64-QAM for example. More generally, examples of modulation types are at least 4-QAM, 16-QAM, and 64-QAM, using a single carrier, or multicarrier types such as OFDM.

Bandwidth requirements of 100 Gb/s and all-optical reach are summarized in: T. Pfau, "Hardware requirements for coherent systems beyond 100 G," in ECOC 2009. An example of a model of quality of transmission for 100 Gb/s is detailed in Sambo, N.; Secondini, M.; Cugini, F.; Bottari, G.; Iovanna, P.; Cavaliere, F.; Castoldi, P.; "Modeling and Distributed Provisioning in 10-40-100-Gb/s Multirate Wavelength Switched Optical Networks," Lightwave Technology, Journal of, vol. 29, no. 9, pp. 1248-1257, Mayl, 2011.

Each link can support S slots of bandwidth B (e.g., S=320 if B=12.5 GHz). PCE is devoted to path computation and slot assignment and it is aware of the QoT of any path in the network. Upon lightpath request of the given bit-rate from source s to destination d, s exploits the PCE communication protocol (PCEP) for submitting path computation requests to the PCE (i.e., using a PCEP PCReq message), which must carry bit-rate information. The database can be a traffic engineering database with detailed and updated slot availability information, i.e. the status (reserved or available) of each slot of bandwidth B on every link. In an example, the PCE performs path computation depending on the bit-rate, the admitted modulation formats (i.e., the ones guaranteeing the QoT at the given bit-rate), and the available slots along the path. Typically for a path connecting s to d, depending on the admitted modulation format and bit-rate, the lightpath requires n-adjacent slots along the whole path. Also, similar to the wavelength continuity constraint, those slots must satisfy the slot continuity constraint, i.e. the same slots are available in all the links along the path.

Dynamic RSA schemes have been proposed in the context of optical orthogonal frequency-division multiplexing (OFDM) where the fine granularity of elastic requests is specifically exploited to occupy a freely variable number of adjacent sub-carriers, as shown in: K. Christodoulopous, et al., "Dynamic bandwidth allocation in flexible OFDM-based networks," in Proc. of OFC/NFOEC, 2011. Frequency slot assignment can be based on first fit technique, meaning a lowest indexed available set of slots is chosen for a new path.

Figure 10:
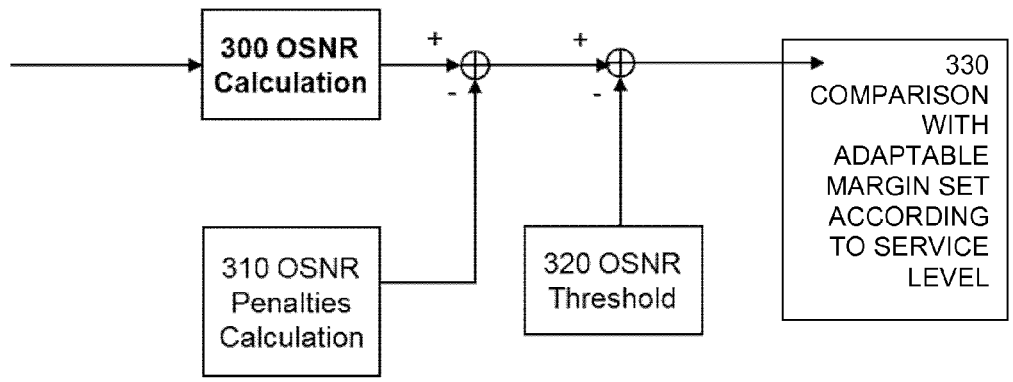
FIGS. 10 and 11 show path validating implementations for embodiments.
Figure 11:
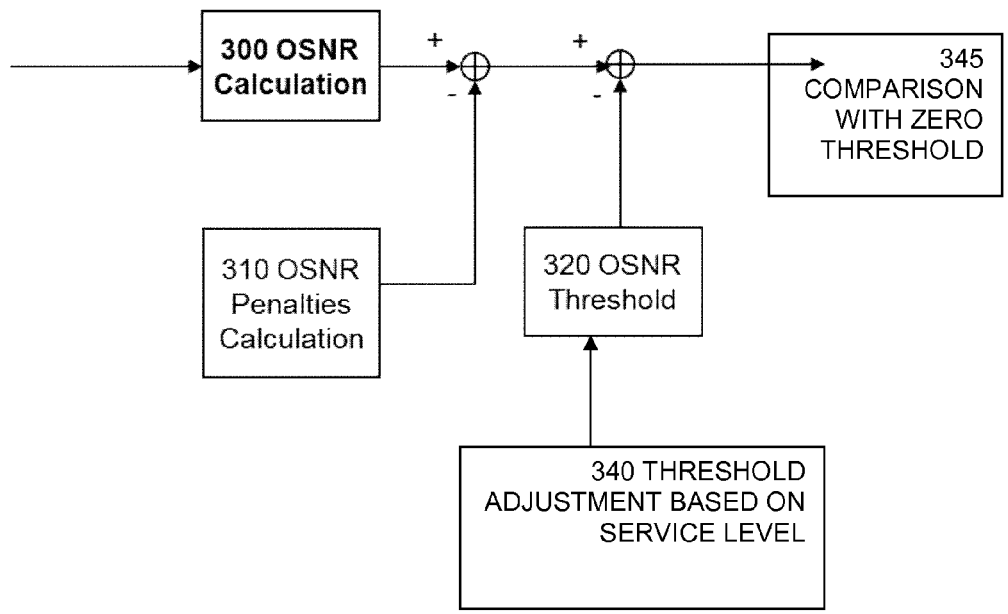

FIGS. 10, 11, Path Validation

FIGS. 10 and 11 show two examples of implementations of the optical path validation function. In FIG. 10 an OSNR calculation 300 is followed by a subtraction of OSNR penalties calculated at 310. This first OSNR calculation may depend on the signal, modulation format and other characteristics. A subtraction of the acceptable OSNR threshold 320 leaves a remaining margin which can be compared at 330 with the adaptable margin set according to the service level. The result is a value which if positive, indicates successful validation. If negative, this indicates unsuccessful validation. Of course there can be multiple levels of output rather than a binary pass or fail output.

OSNR penalties are related to optical impairments affecting the signal transmission in fiber. For example there can be manufacturing variations, jitter penalty, PMD penalty, dispersion, connector loss and fiber loss. For each impairment is estimated a penalty in dB which is subtracted from the "gross OSNR", that is the ideal OSNR if no impairments would be present, to obtain a "net OSNR" which is compared with an OSNR threshold. The difference between the net OSNR and the threshold is the margin. By keeping a high margin, like 3 dB, the transmission will be safer but the possible path will be shorter.

FIG. 11 shows an alternative embodiment in which the adaptable optical quality margin is implemented by adjusting 340 the OSNR threshold 320, the adjustment being according to service level of the client traffic. Optionally the output is fed to a comparison 345 for comparing with a zero threshold to give a binary output. The end result is the same as in FIG. 10. Other implementations can be envisaged in which the adaptable margin is used to adjust the functions 300 or 310, and again the end result will be the same.

Figure 12:
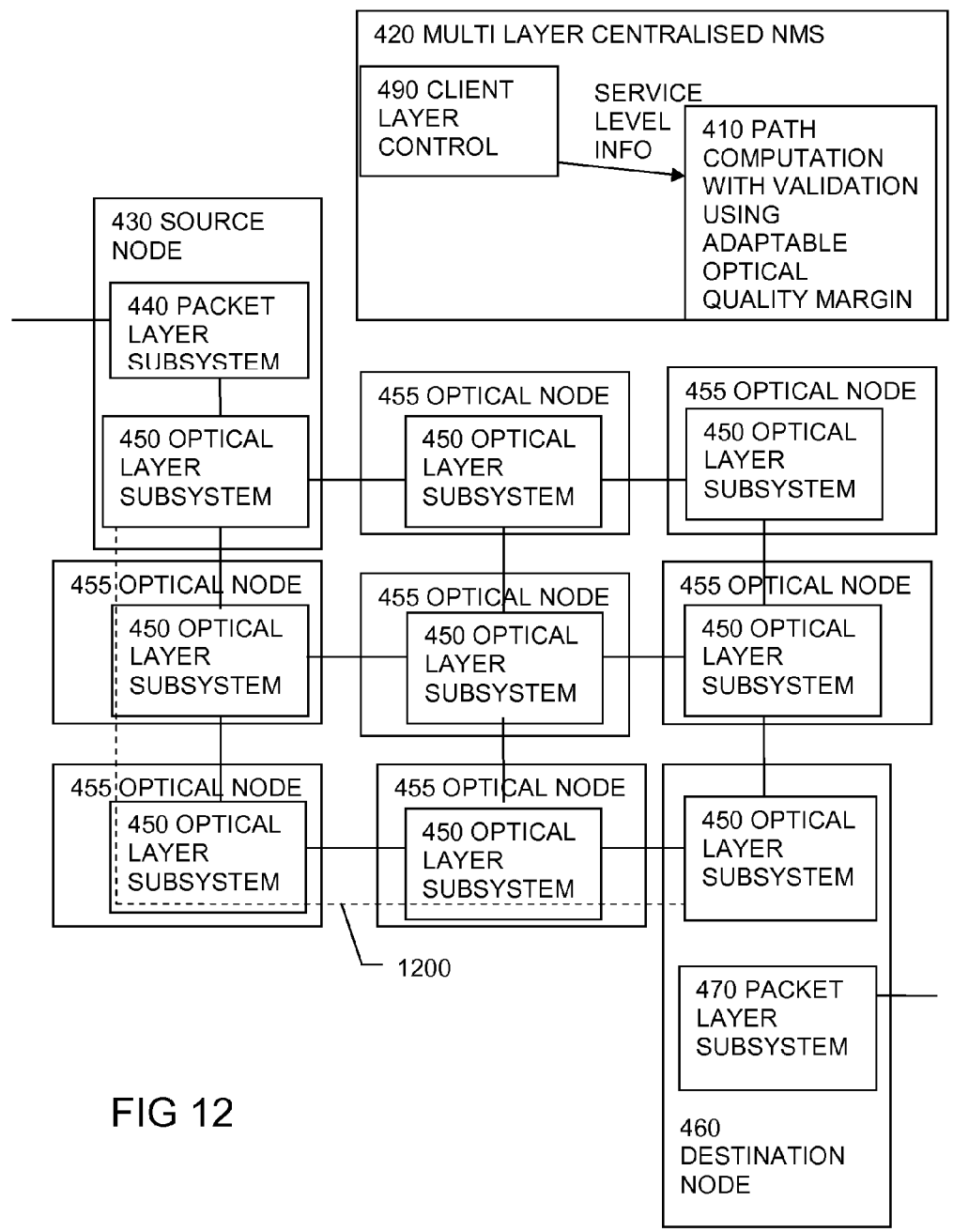
FIG. 12 shows a network view for an embodiment having a centralized NMS.

FIG. 12, Network View

FIG. 12 shows a view of a part of a network to show an example of the additional feature of the path computation and validation for the optical layer being centralized at the NMS. A number of nodes of the network are shown, in particular a source node 430 and a destination node 460, with respect to a particular client traffic. For other client traffic, others of the nodes may be source and destination nodes. The source node has a packet layer subsystem 440, and an optical layer subsystem 450. The destination node 460 has a corresponding packet layer subsystem 440, and an optical layer subsystem 450. For intermediate optical nodes 455 only the optical layer subsystem 450 is shown, though there may be other parts in such nodes. The optical layer subsystems can be for example ROADMs or optical cross connects, or optical switches such as wavelength selective optical switches. Optical links for traffic are shown between the nodes. A dashed line 1200 shows a path selected for the client traffic. A multi layer centralized NMS 420 is shown. This has a client layer control entity 490 able to communicate with the packet layer subsystems in each of the nodes. The centralized NMS also has an optical layer path computation entity 410 with validation using adaptable optical quality margin. This can operate as described above at least in relation to FIG. 2, so that the optical quality margin is adapted according to the service level of the client traffic. The service level is passed from the client layer control entity 490 to the centralized optical layer path computation entity 410. The control functions may be implemented by providing a control agent at each node for cooperating with the centralized control entities.

Figure 13:
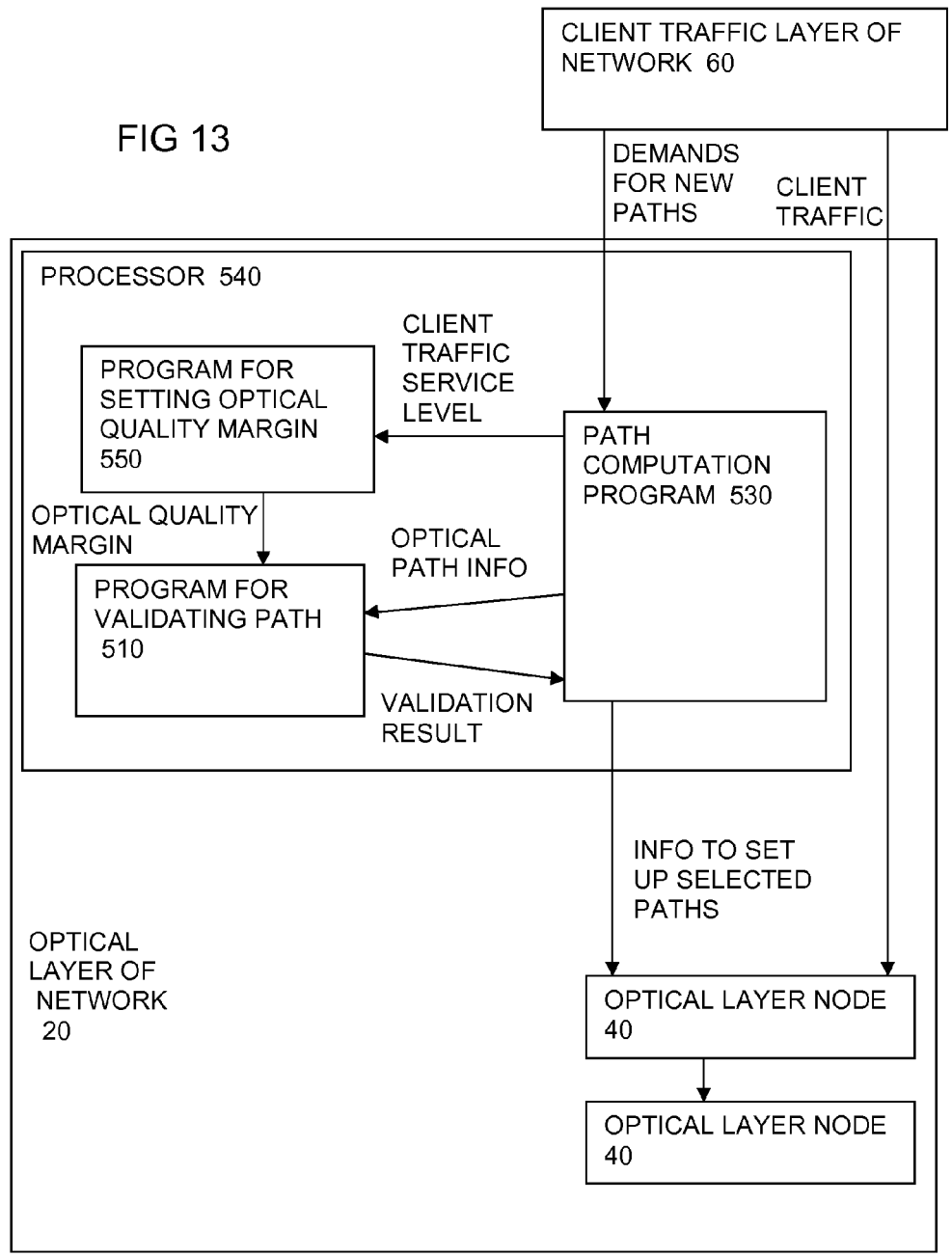
FIG. 13 shows an implementation using programs

FIG. 13 Program Based Example

FIG. 13 shows a schematic view of another embodiment, similar to that of FIG. 1, but showing an example of an implementation of the various functions using programs running on a general purpose processor 540. The functions of path computation, setting optical quality margin, and validating the path using the optical quality margin, can operate as described above. In this case they are implemented by a path computation program 530, a program 550 for setting optical quality margin, and a program 510 for validating the path by checking the estimated quality against the set optical quality margin as described above. Other additional features as described above can also be implemented by such programs running on one or more general purpose processors.

CONCLUDING REMARKS

This service level dependent optical margin can help with content provider demand for reduced CAPEX, compatibly with their different QoS requirements with respect to traditional Telco operators. It can be simple to implement in a multi-technology network. It is compatible with different layer combinations (intermediate layers between packet and optical do not prevent the use of the method). It can help reduce the waste of resources typical of a "service level blind" optical layer where an excess of optical signal quality is unnecessarily allocated for best effort services. It can add a useful feature to the packet-opto solutions to further increase the bandwidth exploitation obtained by the synergy between the two layers. It is compatible with existing/legacy optical devices by allowing, for this kind of nodes, the activation of wavelengths with a reduced margin.

Other variations and additions can be envisaged within the claims.

The invention claimed is:

1. A method of validating a path in an optical layer of a communications network, for client traffic having a service level associated with that client traffic, the method comprising:

setting an optical quality margin according to the service level associated with that client traffic, wherein the optical quality margin is a target value indicative of a level of closeness between an estimated optical quality of the path and a level which produces a threshold error rate in transmitted client traffic; and checking whether the estimated optical quality is within the optical quality margin set according to the client traffic service level, wherein the network has a packet layer, and the method has the preliminary step of passing an indication of the service level associated with the client traffic from a client layer control entity to a control entity of the optical layer, for use in setting the optical quality margin.

2. The method of claim 1, the service level representing a level chosen from at least a best effort service level and a guaranteed service level.

3. The method of claim 1, the client traffic being packet based traffic, and the method having the step of obtaining the service level for the packet based client traffic.

4. The method of claim 1, comprising:

performing an on-the-fly dynamic path computation, wherein the steps of setting the optical quality margin and checking whether the estimated optical quality is within the optical quality margin are performed in the step of performing the on-the-fly dynamic path computation.

5. The method of claim 1, comprising:

performing off-line pre planning of paths for different service levels of possible client traffic; and during on-line operation of the network, selecting between the pre planned paths according to an actual service level of actual client traffic, wherein the steps of setting the optical quality margin and checking whether the estimated optical quality is within the optical quality margin are performed in the step of performing the off-line pre planning of paths for different service levels of possible client traffic.

6. The method of claim 1, comprising:

validating a recovery path for client traffic, wherein the steps of setting the optical quality margin and checking whether the estimated optical quality is within the optical quality margin are performed in the step of validating the recovery path for client traffic.

7. The method of claim 1, the network having at least one intermediate layer between the packet layer and the optical layer, and the step of passing the indication has the steps of passing the indication to a control entity of the intermediate layer, and from the control entity of the intermediate layer to the control entity of the optical layer.

8. The method of claim 1, the optical layer having flexible optical bandwidth multiplexing, and the validating step being part of a path computation comprising selecting any one or more of optical bandwidth, optical bitrate, and optical modulation format for the client traffic.

9. A nontransitory computer readable storage medium comprising instructions which, when executed by a processor, cause the processor to carry out a method of validating a path in an optical layer of a communications network, for client traffic having a service level associated with that client traffic, the method comprising:

setting an optical quality margin according to the service level associated with that client traffic, wherein the optical quality margin is a target value indicative of a level of closeness between an estimated optical quality of the path and a level which produces a threshold error rate in transmitted client traffic; and checking whether the estimated optical quality is within the optical quality margin set according to the client traffic service level, wherein the network has a packet layer, and the method has the preliminary step of passing an indication of the service level associated with the client traffic from a client layer control entity to a control entity of the optical layer, for use in setting the optical quality margin.

10. An apparatus for validating a path in an optical layer of a communications network, for client traffic having a service level associated with that client traffic, the apparatus comprising:
   a processor configured to receive an indication of the service level associated with that client traffic, to set an optical quality margin according to the service level associated with that client traffic, wherein the optical quality margin is a target value indicative of a level of closeness between an estimated optical quality of the path and a level which produces a threshold error rate in transmitted client traffic,
   the processor also being configured to check whether the estimated optical quality is within the optical quality margin set according to the client traffic service level,
   wherein the apparatus is in the form of a multilayer node for a network having a client layer and the optical layer, and having a client layer control entity configured to pass an indication of the service level associated with the client traffic to a control entity for the optical layer, for use in setting the optical quality margin.

11. The apparatus of claim 10 and having a control apparatus for setting up the validated path in an optical switch of the optical layer of the network.

12. The apparatus of claim 11, the optical layer comprising a flexible optical bandwidth multiplexing optical layer and the processor being configured to check a path having a selected optical bandwidth, and the control apparatus being configured to set the optical bandwidth of the validated path in the optical layer according to a result of the check.

13. The apparatus of claim 10 in the form of an apparatus for off-line pre-planning of paths for different service levels of possible client traffic.

* * * * *